UNITED STATES PATENT OFFICE.

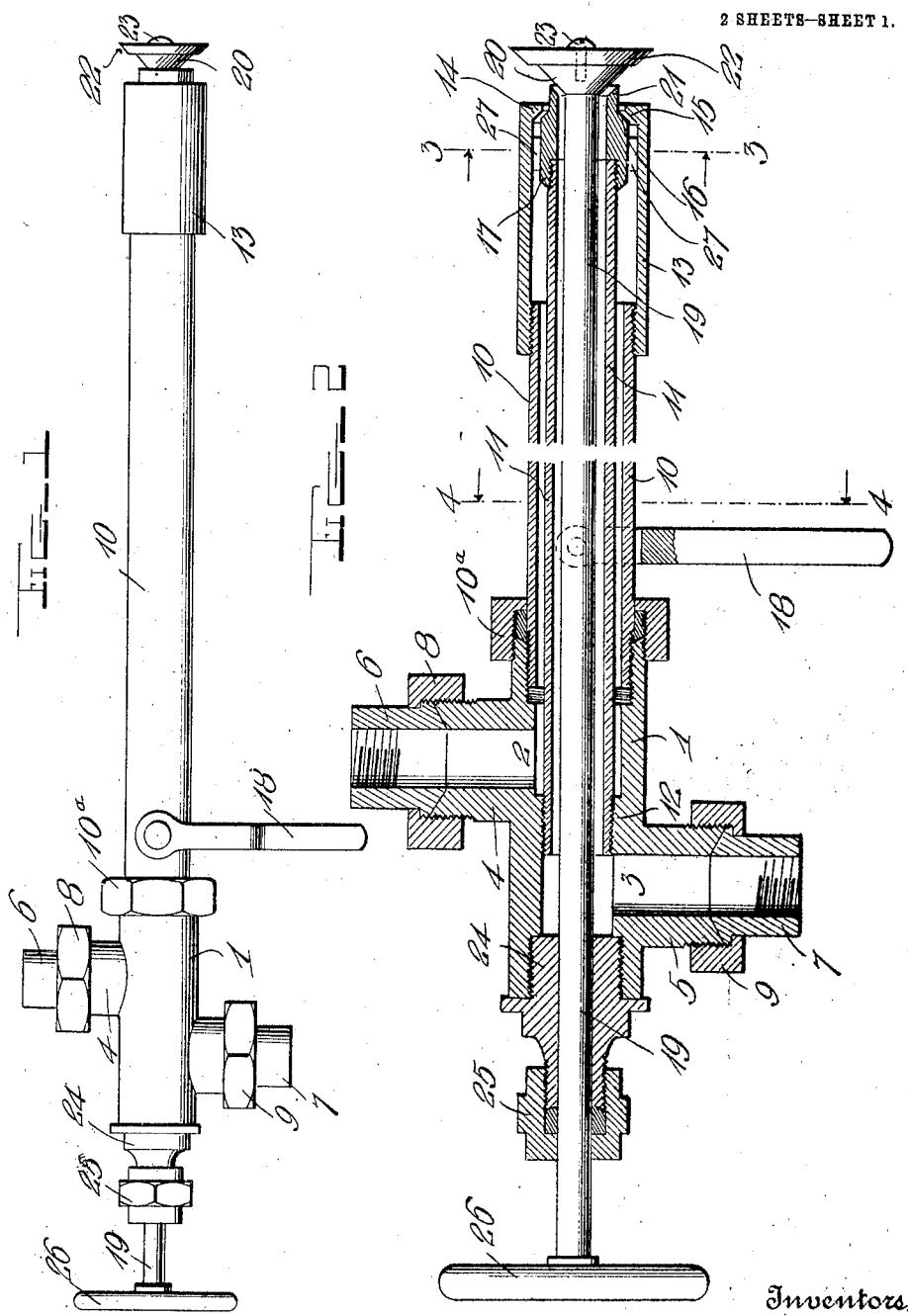

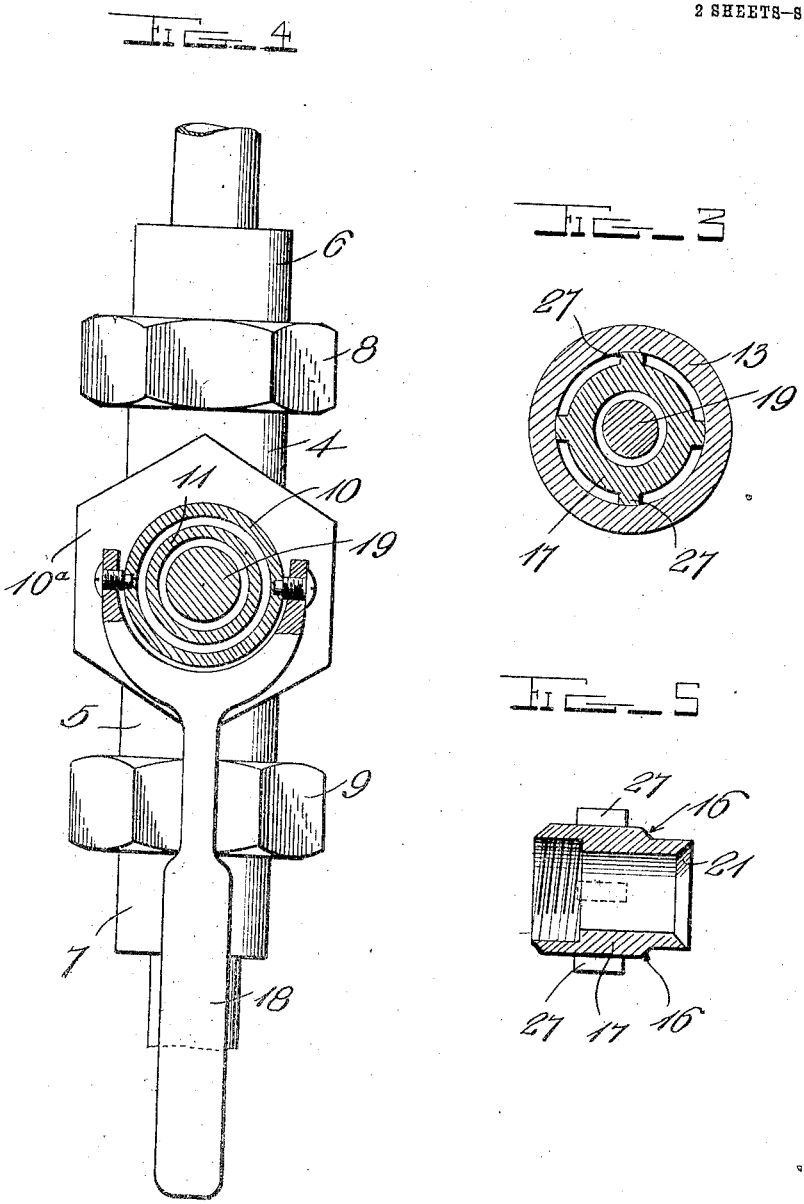

HARRY W. MASON AND WILLIAM J. DONNELLY, OF SAN FRANCISCO, CALIFORNIA, ASSIGNORS TO WALTER R. GROGAN, OF SAN FRANCISCO, CALIFORNIA.

OIL-BURNER.

1,002,594.

Specification of Letters Patent.  Patented Sept. 5, 1911.

Application filed August 22, 1910.  Serial No. 578,285.

*To all whom it may concern:*

Be it known that we, HARRY W. MASON and WILLIAM J. DONNELLY, citizens of the United States, residing at San Francisco, in the county of San Francisco and State of California, have invented certain new and useful Improvements in Oil-Burners; and we do declare the following to be a full, clear, and exact description of the invention, such as will enable others skilled in the art to which it appertains to make and use the same.

This invention relates to improvements in oil burners.

The object is to provide an improved construction of valve whereby the burning fuel is distributed to all parts of the fire box and having means whereby the valve may be conveniently regulated.

With this and other objects in view, the invention consists of certain novel features of construction combination and arrangement of parts as will be more fully described and particularly pointed out in the appended claims.

In the accompanying drawings: Figure 1 is a side view of a burner constructed in accordance with the invention; Fig. 2 is a central longitudinal section of the same; Fig. 3 is a cross sectional view on the line 3—3 of Fig. 2; Fig. 4 is a similar view on the line 4—4 of Fig. 2; Fig. 5 is a detail longitudinal section of the steam regulating valve seat.

In the embodiment of the invention we provide a fitting 1 which is preferably constructed of brass and has formed therein a steam passage 2 and an oil passage 3. The steam passage 2 opens through an exteriorly threaded nipple 4 formed on one side of the fitting, while the oil passage opens through a similar nipple 5 formed on the opposite side of the fitting as shown. The outer ends of the nipples are reamed out to form seats for the inner ends of the coupling members 6 and 7 of unions 8 and 9 whereby steam and oil supply pipes are respectively connected with the steam and oil passages of the fitting.

To the inner end of the fitting 1 is connected the inner end of a steam conducting pipe 10, said pipe extending through a stuffing box 10ª arranged on the end of the fitting as shown. The steam conducting pipe 10 may be of any desired length and is provided with an exteriorly threaded outer end adapted to receive a steam controlling valve hereinafter described. Arranged within the steam conducting pipe 10 and extending across the passage 2 in the fitting is an oil conducting pipe 11, said pipe being of less diameter than the steam pipe whereby a space is formed between said pipes of sufficient size to permit the passage of steam through the pipe 10. The inner end of the oil conducting pipe 11 has a screw threaded engagement with a socket 12 formed in the fitting 1 in the rear of the inner end of the steam passage 2 and communicating with the oil passage 3 as shown. The oil conducting pipe 11 is of slightly greater length than the steam pipe 10 and projects a slight distance beyond the same for a purpose to be described.

On the threaded outer end of the steam conducting pipe 10 is arranged a tubular cylindrical steam controlling valve 13, on the outer end of which is formed an inwardly projecting annular flange 14 having a beveled or inclined inner wall 15, which is adapted to be drawn into engagement with a tapered or inclined seat 16 formed on a sleeve or nipple 17 having a screw threaded engagement with the outer end of the oil conducting tube as shown. By thus arranging the sleeve 17 and the tubular steam valve 13, the beveled wall 15 of the flange 14 may be adjusted to a greater or less distance from the seat 16 on the sleeve by screwing the steam conducting pipe 10 into or out of the inner threaded end of the fitting 1. The connection between the steam conducting pipe and the fitting is prevented from leaking when the pipe is screwed inwardly or outwardly to adjust the steam valve by means of the stuffing box 10ª arranged thereon as hereinbefore described. In order to facilitate the turning of the steam conducting pipe to adjust the valve in the manner described, we preferably provide an operating handle 18, having a bifurcated inner end whereby the same is engaged with and pivotally connected to the pipe 10, thus permitting the latter to be readily turned in the desired direction for opening or closing the steam valve to a greater or less extent.

Arranged in and extending through the oil pipe 11 is the stem 19 of an oil controlling valve 20, which is in the form of a conically shaped or tapered head and which is adapted to be moved into and out of engagement with a valve seat 21 formed by reaming out the outer end of the sleeve 17 through which the valve stem 19 projects. On the outer end of the valve 20 is detachably secured a fuel spreading and atomizing plate 22, said plate having a beveled outer edge which projects to a greater or less distance beyond the edges of the valve 20 and forms the means for deflecting the oil and steam and thoroughly atomizing the same. The plate 22 is detachably secured to the outer surface of the valve 20 by means of a fastening screw 23 or other suitable device whereby said plate may be removed and a larger or smaller plate applied to the valve to spread the burning fuel to a greater or less extent. The inner end of the stem 19 of the oil valve passes through the longitudinal bore of the fitting 1 and through a block 24 and stuffing box 25 arranged on the inner end of the fitting, and has on its inner end a knob or handle 26 whereby the oil valve 20 may be regulated to permit the discharge of a greater or less amount of oil from the oil pipe. By thus arranging the steam and oil valves the same may be regulated to permit the proper relative discharge of steam and oil from the burner, thus obtaining a perfect combustion of the fuel and providing for the economical use of the latter. The sleeve 17 containing the steam and oil valve seats is provided on its outer surface with a series of radially projecting spacing lugs 27 whereby said sleeve is centered in the valve 13, which will prevent the sleeve from interfering with the free passage of the steam when the valve is in an open position.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as defined in the appended claims.

Having thus described our invention, what we claim is:

1. An oil burner comprising a fitting having oppositely disposed steam and oil inlet passages, a longitudinally adjustable steam-conducting pipe threaded to one end of said fitting and communicating with the steam inlet passage therein, an oil-conducting pipe arranged within the steam pipe and connected with the oil inlet passage in said fitting, a sleeve arranged on the outer end of said oil-conducting pipe, said sleeve having its outer end internally beveled to form an oil valve seat and having an externally disposed beveled shoulder to form a steam valve seat, a tubular steam valve arranged on the outer end of said steam-conducting pipe and having on its outer end an internal annular flange adapted to coact with the steam valve seat of said sleeve, a valve stem arranged in and extending through said oil pipe, a flared oil valve on the outer end of said stem adapted to coact with the oil valve seat of said sleeve, and means to adjust said steam valve and said oil valve to control the discharge of steam and oil.

2. An oil burner comprising a fitting having steam and oil inlet passages formed therein, a longitudinally adjustable steam-conducting pipe threaded to one end of said fitting and communicating with the steam passage therein, an oil-conducting pipe of less diameter than said steam pipe arranged therein and secured within the fitting to communicate with the oil inlet passage therein, a sleeve arranged on the outer end of said oil-conducting pipe, said sleeve having a beveled end to form an internal valve seat and a beveled shoulder forming an external valve seat, a tubular steam valve arranged on the outer end of said steam-conducting pipe and having on its outer end an external annular flange adapted to coact with the external valve seat of said sleeve, a valve stem arranged in and extending through said oil pipe, an oil valve on the outer end of said stem adapted to coact with the external valve seat of said valve, a flared spreader-plate secured to the outer side of said oil valve and extending beyond the burner, a stuffing box on the steam-conducting pipe at its connection with the fitting, a handle connected with said steam pipe, a stuffing box arranged on the outer end of the fitting around the valve stem, and a handle secured to said stem.

In testimony whereof we have hereunto set our hands in presence of two subscribing witnesses.

HARRY W. MASON.
WILLIAM J. DONNELLY.

Witnesses:
JAMES L. NAGLE,
PETER B. NAGLE.